(12) United States Patent
Walser et al.

(10) Patent No.: US 11,097,385 B2
(45) Date of Patent: Aug. 24, 2021

(54) METHOD FOR PRODUCING A HEAT PIPE

(71) Applicant: COMPAGNIE GENERALE DES ETABLISSEMENTS MICHELIN, Clermont-Ferrand (FR)

(72) Inventors: Daniel Walser, Clermont-Ferrand (FR); Bruno Fragniere, Clermont-Ferrand (FR)

(73) Assignee: COMPAGNIE GENERALE DES ETABLISSEMENTS MICHELIN, Clermont-Ferrand (FR)

(*) Notice: Subject to any disclaimer, the term of this patent is extended or adjusted under 35 U.S.C. 154(b) by 184 days.

(21) Appl. No.: 16/314,112

(22) PCT Filed: Jun. 23, 2017

(86) PCT No.: PCT/FR2017/051677
§ 371 (c)(1),
(2) Date: Dec. 28, 2018

(87) PCT Pub. No.: WO2018/002489
PCT Pub. Date: Jan. 4, 2018

(65) Prior Publication Data
US 2019/0224789 A1    Jul. 25, 2019

(30) Foreign Application Priority Data
Jun. 29, 2016   (FR) ...................................... 1656089

(51) Int. Cl.
*B23P 15/26* (2006.01)
*F28D 15/02* (2006.01)

(52) U.S. Cl.
CPC .............. *B23P 15/26* (2013.01); *F28D 15/02* (2013.01); *F28D 15/0283* (2013.01); *B23P 2700/09* (2013.01)

(58) Field of Classification Search
CPC ...... B21D 39/04; B21D 39/048; B21C 5/003; B21C 5/00; F16L 13/14
See application file for complete search history.

(56) References Cited

U.S. PATENT DOCUMENTS 3,292,414 A * 12/1966 Goeke .................... B21C 5/003
                                                    72/402
3,695,087 A * 10/1972 Tuberman ................. B21C 5/00
                                                    72/402
(Continued)

FOREIGN PATENT DOCUMENTS

CN      1480703 A      3/2004
JP      58016187 A *   1/1983    ........... F28D 15/046
(Continued)

OTHER PUBLICATIONS

Machine Translation of JP-11294980-A (Year: 1999).*
(Continued)

*Primary Examiner* — Jacob J Cigna
(74) *Attorney, Agent, or Firm* — Venable LLP

(57) ABSTRACT

A method for producing a heat pipe comprises the following steps, performed on a first tube made from a malleable material: the diameter of the tube is swaged at a first end, and the end thus swaged is sealed closed; a second tube, of a smaller diameter than the first, is inserted into the second end of the first tube the second end of the first tube is swaged around the second tube and the interface between the two tubes is sealed the pipe thus created is partially filled with a heat-transfer fluid the air contained in the pipe is removed; and the free end of the second tube is sealed closed.

8 Claims, 1 Drawing Sheet

(56) References Cited

U.S. PATENT DOCUMENTS

| | | | |
|---|---|---|---|
| 4,018,269 A * | 4/1977 | Honda | F28D 15/046 |
| | | | 165/104.26 |
| 5,743,014 A * | 4/1998 | Giammaruti | F28D 15/0283 |
| | | | 29/890.032 |
| 5,895,868 A | 4/1999 | Giammaruti et al. | |
| 6,907,918 B2 * | 6/2005 | Connors | F28D 15/0283 |
| | | | 165/104.21 |
| 8,459,339 B2 * | 6/2013 | Liu | F28D 15/04 |
| | | | 165/104.21 |
| 9,692,092 B2 | 6/2017 | Walser et al. | |
| 2005/0051259 A1 | 3/2005 | Luo | |
| 2006/0162160 A1 | 7/2006 | Hsu | |
| 2007/0062038 A1 | 3/2007 | Hou et al. | |
| 2007/0089376 A1 * | 4/2007 | Wong | B23P 15/26 |
| | | | 53/50 |
| 2007/0290505 A1 | 12/2007 | Lin et al. | |
| 2009/0101323 A1 * | 4/2009 | Takagi | C22C 9/02 |
| | | | 165/180 |
| 2009/0208829 A1 | 8/2009 | Howard et al. | |
| 2012/0227935 A1 * | 9/2012 | Huang | B21D 41/04 |
| | | | 165/104.26 |
| 2016/0126602 A1 | 5/2016 | Walser et al. | |

FOREIGN PATENT DOCUMENTS

| | | | | |
|---|---|---|---|---|
| JP | 61213599 A | * | 9/1986 | F28D 15/0283 |
| JP | 04032695 A | * | 2/1992 | |
| JP | 11294980 A | * | 10/1999 | F28D 15/046 |
| JP | 2006200775 A | * | 8/2006 | |
| WO | 2014/198778 A1 | | 12/2014 | |

OTHER PUBLICATIONS

Machine Translation of JP-04032695-A (Year: 1992).*
Machine Translation of JP-58016187-A (Year: 1983).*
International Search Report dated Sep. 20, 2017, in corresponding PCT/FR2017/051677 (6 pages).

* cited by examiner

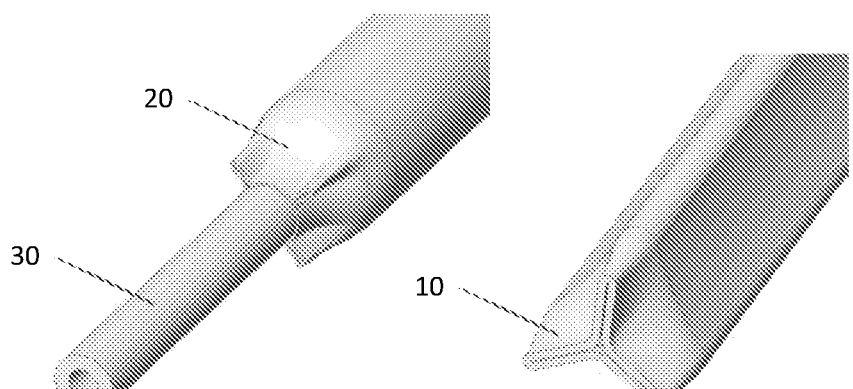
Fig. 1a
Fig. 1b
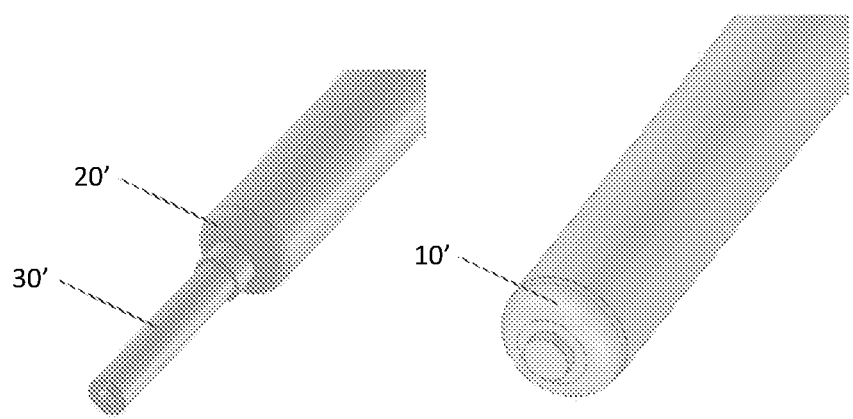
Fig. 2a
Fig. 2b
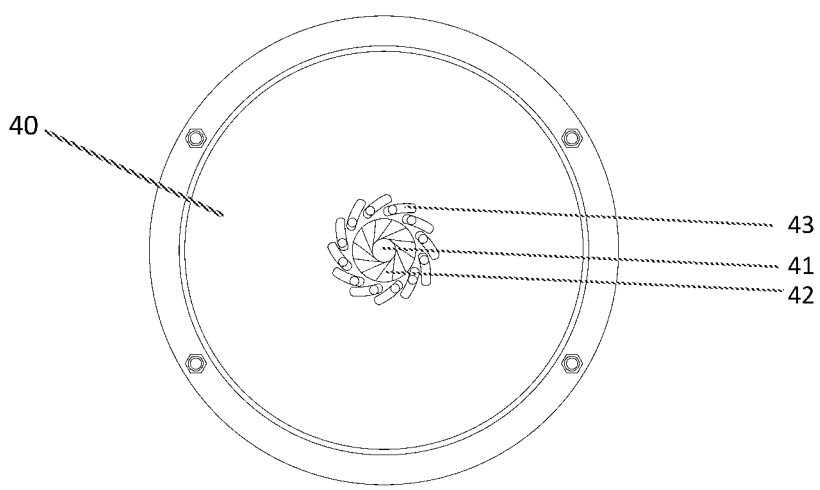
Fig. 3

METHOD FOR PRODUCING A HEAT PIPE

FIELD OF THE INVENTION

The present invention falls within the field of cooling using a heat pipe containing a heat-transfer fluid. For preference, the present invention relates to the field of battery cooling, particularly although not exclusively the cooling of batteries used in vehicles or stationary batteries.

With the development of electric vehicles and hybrid vehicles, batteries have become a major issue within the automotive industry. The batteries now need to provide enough energy to offer the vehicles sufficient autonomy, while at the same time having a life that does not require the battery to be changed. Furthermore, it is useful for the batteries to be able to operate correctly under all vehicle running conditions, whether these be temperature, humidity, or other conditions.

Now, it is known that an optimum operating temperature for such batteries is generally situated between 20° C. and 35° C. It is therefore useful to provide a high-performance cooling system in order to prevent the batteries from overheating.

Application PCT/EP2014/062136 already discloses a battery unit comprising a set of battery cells and at least one cooling device. The cooling device comprises a heat collecting plate in contact with an external surface of at least one battery cell, a heat pipe in contact with the heat collecting plate, and a heat dissipating element. The heat dissipating element comprises a circular orifice in which the cylindrical heat pipe is positioned.

The principle of the cooling device is as follows: each heat pipe, sometimes called heat-pipe, contains a fluid which vaporizes in the vicinity of the battery cells, under the effect of the heat emitted during battery operation. The vapour thus formed therefore fills the heat-pipe as far as the beginning of the dissipation element, namely as far as the dissipation-device inlet closest to the battery cells. When the vapour is in that part of the heat pipes which is positioned in the dissipation element, the atmospheric air circulating in this dissipation element cools the fluid to the point at which it returns to the liquid phase and drops back down towards the battery cells.

The term battery cell used here is equivalent to the term electric accumulator or battery element. The battery cells are, in one example, cylindrical in shape. However, the invention applies to battery cells of any shape and of any power.

A battery unit employing parallelepipedal heat-pipes is also known, from application US 2009/0208829. However, it was found that the use of such heat-pipes led to additional complexity and mass because, in order to avoid the two opposite faces of the parallelpiped touching when a depression is created in the heat-pipe, it is necessary to use stiffer materials or designs conferring the desired stiffness, which are therefore often heavier.

The objective of the present invention is therefore to provide heat-pipes that make it possible to overcome this disadvantage of the prior art, while at the same time offering good cooling performance. More specifically, the present invention seeks to provide a method for producing such heat-pipes.

BRIEF DESCRIPTION OF THE INVENTION

Thus, the invention relates to a method for producing a heat pipe, comprising the following steps, performed on a first tube made from a malleable material:

The diameter of the tube is swaged at a first end, and the end thus swaged is sealed closed, A second tube made from a malleable material, of a smaller diameter than the first, is inserted into the second end of the first tube, The second end of the first tube is swaged around the second tube and the interface between the two tubes is sealed, The pipe thus created is partially filled with a heat-transfer fluid, for example with a quantity of fluid of the order of 1 milliliter, The air contained in the pipe is removed, and The free end of the second tube is sealed closed.

In the remainder of the description, the term "tube" will be used to denote the basic cylindrical elements employed in the production method. The terms "heat pipe" or "heat-pipe" will be used indiscriminately to denote the assembly of the tubes.

In one preferred embodiment, the malleable material is a material with high thermal conductivity, for example annealed copper, which means to say copper which has been heated after hardening, making it more malleable. In order to obtain the best performance, it is useful for the end of the heat pipe, where the evaporation takes place, to be made from a material having high thermal conductivity. By contrast, the central part of the heat pipe may be made from another material, because it is used only to allow fluid to circulate. Thus, in one embodiment, only the end of the heat pipe is made from a material having high conductivity. However, the use of a heat pipe made from a single material makes it possible to reduce costs and simplify the production method.

It is emphasized here that, in a method according to the invention, the swaging steps and the subsequent steps are performed at ambient temperature on annealed copper, which is more malleable than copper which has not been annealed.

In one preferred embodiment, the tubes employed in the production method are grooved in the shape of a helicoid on their internal surface.

For good heat-pipe operation, it is necessary for the fluid, having returned to the liquid phase, to move as far as the elements that are to be cooled. In instances in which the battery module is in a substantially vertical position, this movement is achieved under the effect of gravity, because the fluid in the liquid phase is heavier than in the gaseous phase. It is therefore found that, when the battery operates in a position other than the vertical position, operation is degraded as a result, because gravity no longer acts in a direction parallel to the orientation of the heat pipes, and therefore no longer allows such an effective movement of the fluid. In order to overcome that, there are a number of conceivable solutions. Thus, in one preferred embodiment, the heat tubes are grooved on their internal surface, so as to increase the condensation area, this being with a view to increasing exchanges of heat. In another configuration, it is useful to install, inside the heat pipes, means that allow the fluid to move by capillarity, for example a lattice.

In one preferred embodiment, the sealed closure of the first end of the first tube is achieved by brazing.

In one preferred embodiment, the sealed closure of the free end of the second tube comprises the following steps:

The part of the second tube which is situated on the outside of the first tube is crushed until it seals, The second tube is cut at the crushed part.

Furthermore, in order to preserve the sealing, notably in the long term, the step of sealing the free end of the second tube closed comprises, in one advantageous embodiment, a final step during which the new free end of the second tube is welded. In this case, the crushing step makes it possible to achieve a temporary seal for the time it takes to perform this welding step.

There are two conceivable solutions for performing the swagings in a method according to the invention. Thus, in a first embodiment, the swagings are performed using a three jaw or four jaw chuck, making it possible to obtain a star-shaped swage. In a second embodiment, the swagings are performed using a swaging tool in the form of a shutter, making it possible to obtain a ring-shaped swage, with a shape which is perfectly even around the entire circumference.

Star-shaped swaging is particularly advantageous for large-diameter tubes which would be difficult to swage any other way. Use of ring-shaped swaging makes the production process easier because the brazing that allows the interface between the two tubes to be sealed is easier to perform on a circular surface than on a crenellated surface obtained by star-shaped swaging.

As already mentioned, a production method according to the invention comprises a step during which the air present in the pipe is removed. Once again, the invention considers a number of solutions. Thus, a first solution is to connect a vacuum pump to the free end of the second tube and to suck out the air until a partial air pressure of between 0 and 70 mbar is obtained in the tube. It must be emphasized here that the vacuum pump will need to be correctly selected in order to allow these pressure levels to be achieved.

A second solution, which makes it possible to avoid the use of a vacuum pump, is to heat the closed end of the first tube until the heat-transfer fluid boils. In this case, the heat-transfer fluid vaporizes, and the gas thus formed creates a raised pressure in the heat-pipe, thus expelling the air out of the heat-pipe. However, this solution may prove difficult to implement because it entails fine control over the boiling time, so as to ensure that, at the end of this air-expulsion step, there is still enough heat-transfer fluid left in the heat-pipe to allow the heat-pipe to operate correctly once it has been installed in a system that is to be cooled.

The invention also relates to a heat pipe obtained by a production method according to the invention, and to a battery unit comprising at least one such heat pipe.

BRIEF DESCRIPTION OF THE FIGURES

Other objectives and advantages of the invention will become clearly apparent in the following description of a preferred, but non-limiting, embodiment, illustrated by the following figures, in which:

FIGS. 1a and 1b show the ends of a heat pipe produced according to one embodiment of a method according to the invention, employing a star-shaped swage.

FIGS. 2a and 2b show the ends of the heat pipe produced according to one embodiment of a method according to the invention, employing a ring-shaped swage, and FIG. 3 shows a tool employed in one particular embodiment of a method according to the invention.

DESCRIPTION OF THE BEST EMBODIMENT OF THE INVENTION

As previously described, a heat pipe produced using a method according to the invention comprises two tubes which are assembled to form the pipe. The pipe thus formed comprises two ends, a first which could be described as "ordinary", and a second end that can be referred to as "composite", because it comprises the second tube inserted inside the first tube.

One particular embodiment of the present invention will be described hereinafter. The first tube, which can be seen in FIGS. 1 and 2, comprises a first end 10, 10', and a second end 20, 20'. A second tube 30, 30' is inserted in this second end 20, 20'.

The first tube is preferably made of annealed copper. It has a diameter of the order of 10 millimetres, and a length of a few centimeters. The second tube is also preferably made of annealed copper and has a diameter of 4 millimetres. It is also emphasized that the wall of the second tube needs to be thick enough, for example of the order of 1 millimeter thick, that it does not become damaged during the crushing step. It also needs to be stiff enough that it remains in place after crushing, so as to prevent the tube from opening back up again, as this could lead to tube sealing problems.

At the ordinary end, a total swage needs to be achieved so that a braze can later be performed in order to seal the pipe. At the composite end, the swaging is performed around the second tube. As previously described, there are a number of solutions considered for performing this swaging. Thus, in a first embodiment shown in FIGS. 1a and 1b, a three jaw or four jaw chuck is used to perform the swaging, yielding a star-shaped swage. As can be seen in FIGS. 1a and 1b, use may for example be made of a three jaw chuck, as shown in FIG. 1b for the ordinary end, and of a four jaw chuck or other type of chuck. This solution may be advantageous for large-diameter tubes but makes the subsequent operations of achieving sealing, for example by brazing or welding, more complicated because the shape that has to be welded is complex.

In the case of heat-pipes which are intended to be installed in a battery unit, the number of chuck jaws used will, for example, be selected according to the desired architecture and notably according to the number of battery cells that are to be installed around each heat-pipe.

The second solution, shown in FIGS. 2a and 2b, is to make a ring-shaped swage. Advantageously, in order to do this, use will be made of a swaging tool as shown in FIG. 3. The ring-shaped swage makes a production method according to the invention easier to industrialize since the sealing operations performed for example by welding are easier and more readily repeatable on long production runs.

The swaging tool shown in FIG. 3 is created according to the same principle of operation as a photographic shutter. Thus, this tool comprises an outer disc 40, having a circular opening 41 at its centre. Installed within this circular opening are leaves 42 and an activating ring 43. The leaves are secured, at one of their ends, to the activating ring 43. Rotating the ring 43 causes the leaves to move into a position in which the orifice 41 is smaller.

Thus, if a tube is inserted into the orifice 41 and the ring is activated, the pressure applied by the leaves to the tube leads to circular swaging of the tube shape. This leaf geometry makes it possible to obtain swaging that is uniform over the entire circumference of the tube. The choice of the number and size of the leaves will be made carefully in order to make it possible to swage the entire tube without damaging the wall of the tube.

Once the swaging operations have been performed, the second tube has been inserted inside the first tube and the brazing and/or welding steps have been performed, a method according to the invention comprises the step of filling the pipe thus created with a heat-transfer fluid and of then removing the air contained in the pipe.

The invention claimed is:

1. A method for producing a heat pipe comprising the steps:
   swaging a diameter of a first tube, at a first end, and sealing the first end closed;
   inserting a first end of a second tube, of a smaller diameter than the first tube, into a second end of the first tube;
   swaging the second end of the first tube around the second tube, and sealing an interface between the two tubes to form a heat pipe;
   partially filling the heat pipe with a heat-transfer fluid;
   removing air contained in the heat pipe; and
   sealing a second end of the second tube closed,
   wherein the first tube and the second tube are made from annealed copper.

2. The method according to claim 1, wherein the first end of the first tube is sealed by brazing.

3. The method according to claim 1, wherein the swagings are performed using a three-jaw or four-jaw chuck.

4. The method according to claim 1, wherein the swagings are performed using a shutter-shaped swaging tool.

5. The method according to claim 1, wherein the removing step is performed by connecting a vacuum pump to the second end of the second tube and sucking out the air until a partial air pressure of between 0 and 70 mbar is obtained in the heat tube.

6. The method according to claim 1, wherein the removing step is performed by heating the closed end of the first tube until the heat-transfer fluid boils.

7. The method according to claim 1 further comprising the following steps to seal the second end of the second tube:
   crushing a part of the second tube which is situated outside of the first tube until it seals; and
   cutting the second tube at the crushed part.

8. The method according to claim 7 further comprising the following step to seal the second end of the second tube:
   welding the cut end of the second tube to strengthen sealing.

* * * * *